(12) United States Patent
Kurzweil

(10) Patent No.: US 8,965,771 B2
(45) Date of Patent: Feb. 24, 2015

(54) USE OF AVATAR WITH EVENT PROCESSING

(75) Inventor: Raymond C. Kurzweil, Newton, MA (US)

(73) Assignee: Kurzweil AINetworks, Inc., Newton, MA (US)

( * ) Notice: Subject to any disclaimer, the term of this patent is extended or adjusted under 35 U.S.C. 154(b) by 1049 days.

(21) Appl. No.: 10/730,485

(22) Filed: Dec. 8, 2003

(65) Prior Publication Data

US 2005/0125229 A1     Jun. 9, 2005

(51) Int. Cl.
*G10L 21/00*   (2013.01)
*G06Q 30/02*   (2012.01)

(52) U.S. Cl.
CPC ..................................... *G06Q 30/02* (2013.01)
USPC .......................................... 704/275; 704/270

(58) Field of Classification Search
USPC .......... 704/270, 275; 705/10, 26, 27; 715/727, 715/728, 745
See application file for complete search history.

(56) References Cited

U.S. PATENT DOCUMENTS

| | | | | |
|---|---|---|---|---|
| 4,016,540 A * | 4/1977 | Hyatt | ............................ | 704/258 |
| 5,357,596 A * | 10/1994 | Takebayashi et al. | ......... | 704/275 |
| 5,594,789 A * | 1/1997 | Seazholtz et al. | ........... | 379/88.02 |
| 6,006,225 A * | 12/1999 | Bowman et al. | .................... | 707/5 |
| 6,029,158 A * | 2/2000 | Bertrand et al. | ................. | 706/45 |
| 6,185,558 B1 * | 2/2001 | Bowman et al. | .................... | 707/5 |
| 6,246,981 B1 * | 6/2001 | Papineni et al. | .............. | 704/235 |
| 6,250,928 B1 * | 6/2001 | Poggio et al. | .................. | 434/185 |
| 6,266,649 B1 * | 7/2001 | Linden et al. | ..................... | 705/26 |
| 6,349,290 B1 * | 2/2002 | Horowitz et al. | ............... | 705/35 |
| 6,466,654 B1 * | 10/2002 | Cooper et al. | ............. | 379/88.01 |
| 6,499,015 B2 * | 12/2002 | Brooks et al. | ................. | 704/275 |
| 6,570,555 B1 * | 5/2003 | Prevost et al. | ................. | 345/156 |
| 6,587,822 B2 * | 7/2003 | Brown et al. | ................. | 704/275 |
| 6,658,389 B1 * | 12/2003 | Alpdemir | ....................... | 704/275 |
| 6,665,643 B1 * | 12/2003 | Lande et al. | .................. | 704/266 |
| 6,701,294 B1 * | 3/2004 | Ball et al. | ...................... | 704/257 |
| 6,735,566 B1 * | 5/2004 | Brand | .......................... | 704/256 |
| 6,853,982 B2 * | 2/2005 | Smith et al. | ..................... | 705/27 |
| 6,985,897 B1 * | 1/2006 | Abrahams | ........................ | 707/4 |
| 7,050,977 B1 * | 5/2006 | Bennett | ....................... | 704/270.1 |
| 2001/0014868 A1 * | 8/2001 | Herz et al. | ....................... | 705/14 |
| 2002/0010584 A1 * | 1/2002 | Schultz et al. | ................ | 704/270 |
| 2003/0028498 A1 * | 2/2003 | Hayes-Roth | .................... | 706/17 |
| 2003/0191649 A1 * | 10/2003 | Stout et al. | ..................... | 704/275 |
| 2004/0039990 A1 * | 2/2004 | Bakar et al. | .................... | 715/505 |
| 2004/0070606 A1 * | 4/2004 | Yang et al. | ..................... | 345/745 |
| 2004/0103023 A1 * | 5/2004 | Irwin et al. | ..................... | 705/14 |
| 2004/0104930 A1 * | 6/2004 | Stoler | ........................... | 345/738 |
| 2004/0165703 A1 * | 8/2004 | Jones | ......................... | 379/88.13 |

* cited by examiner

*Primary Examiner* — Douglas Godbold
(74) *Attorney, Agent, or Firm* — Fish & Richardson P.C.

(57) ABSTRACT

Conducting commerce over a network, e.g., the Internet includes receiving a transaction request from a user as text input, using natural programming language to analysis the text input to build conversations with the user based on the transaction request. The technique also includes generating a voice-synthesized response in accordance with the transaction through an avatar and tracking the transaction by storing the transaction in the database.

43 Claims, 7 Drawing Sheets

USE OF AVATAR WITH EVENT PROCESSING

BACKGROUND

This invention relates to a virtual reality avatar.

Servers located around the Internet serve up content to users on demand. A user interacting through a search engine enters a text query for information and the search results are displayed to the user as text, graphics, audio and/or video, using a graphical user interface (GUI) such as an Internet browser.

SUMMARY

According to an aspect of the present invention a method of conducting commerce includes receiving a transaction request from a user as text input and using natural programming language to analysis the text input to build conversations with the user based on the transaction request. The method also includes conducting the transaction with the user based on the text input, generating a voice-synthesized response in accordance with the transaction through an avatar and tracking the transaction by storing the transaction in the database.

Tracking searches a database to find related information associated with conducting the transaction. The method can generate follow-up messages to send to the user is based on added information stored in the database. The method can statistically analyze responses to follow-up messages to generate marketing related information.

The transaction can be a user request as to order status for an order being tracked in the database, an inquiry as to financial information related to the user, support for a sales transaction, a report or a help desk inquiry that involves customer support for a product or service. The transaction can support a report for customer support to report a malfunctioning product, system, or service. The method can generate responses by searching a conversational engine in conjunction with a match and animate the avatar with a voice and facial movements corresponding text produced from the match.

According to an aspect of the present invention a computer program product for conducting commerce includes instructions to cause a computer to receive a transaction from a user as text input, and use natural programming language to analysis the text input to build conversations with the user based on the transaction request. The method further includes instructions to generate a voice-synthesized response in accordance with the transaction through an avatar and track the transaction by storing the transaction in the database.

In some aspects the method further includes instructions to search a database for related content that can further assist in conducting the transaction.

One or more of the following may also be included. The text input may include a user query. The database may include content residing on a server system. The server system may be linked to a globally connected group of computer systems.

Instructions to generate the response may include instructions to search a database in conjunction with the transaction, and animate the avatar with a voice and facial movements representing text associated with the transaction. Animating may be based on a history of a user interaction with the database. Animating may include generating helpful verbal suggestions for completing the transaction based on further queries to the database. Animating may include natural language processing (NLP) techniques to develop and build conversations between the user and the avatar. Thus, completing the transaction may be in response to receiving the text input and producing a suggestion generated by the avatar.

Other features, objects, and advantages of the invention will be apparent from the description and drawings, and from the claims.

DETAILED DESCRIPTION

Figure 1:
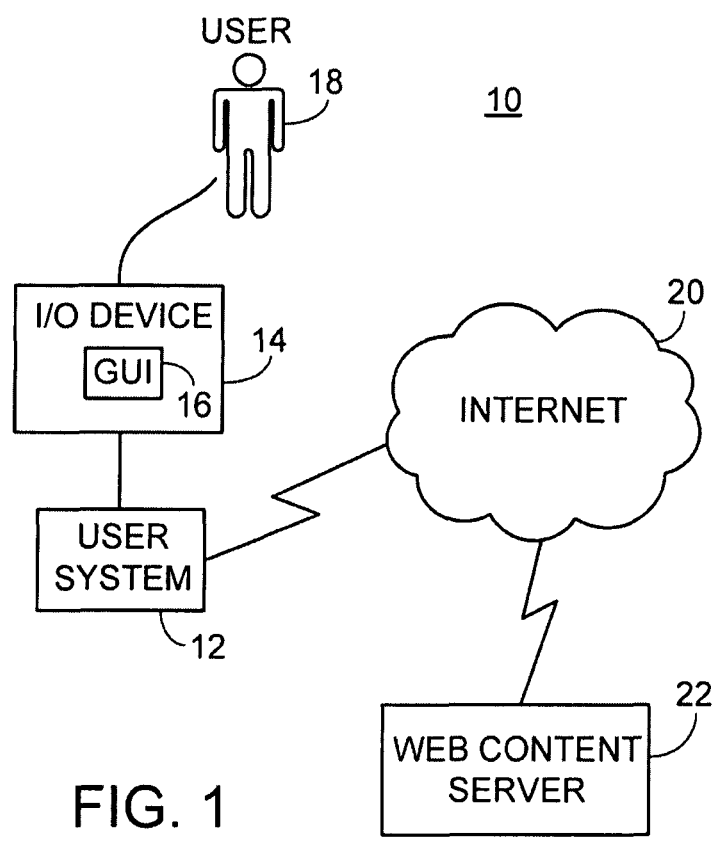
FIG. 1 is a block diagram of a network.

Referring to FIG. 1, a network 10 includes a user system 12 linked to a group of globally connected computers, i.e., the Internet 20. The user system 12 includes input/output (I/O) device 14 for display of a graphical user interface (GUI) 16 to a user 18. The user 18 interacts with the Internet 20 through execution of browser software, such as Netscape Communicator from AOL, Inc. or Internet Explorer from Microsoft Corp., on the GUI 16.

The network 10 includes a web content server 22 linked to the Internet 20. The user, through the web browser software, accesses content residing in databases in the web content server 22. The user 18 connects to the web content server 22 by entering its Universal Resource Locator (URL) address. The web content server 22 URL may also be obtained from executing a search engine through the browser software on the user system 12.

Figure 2:
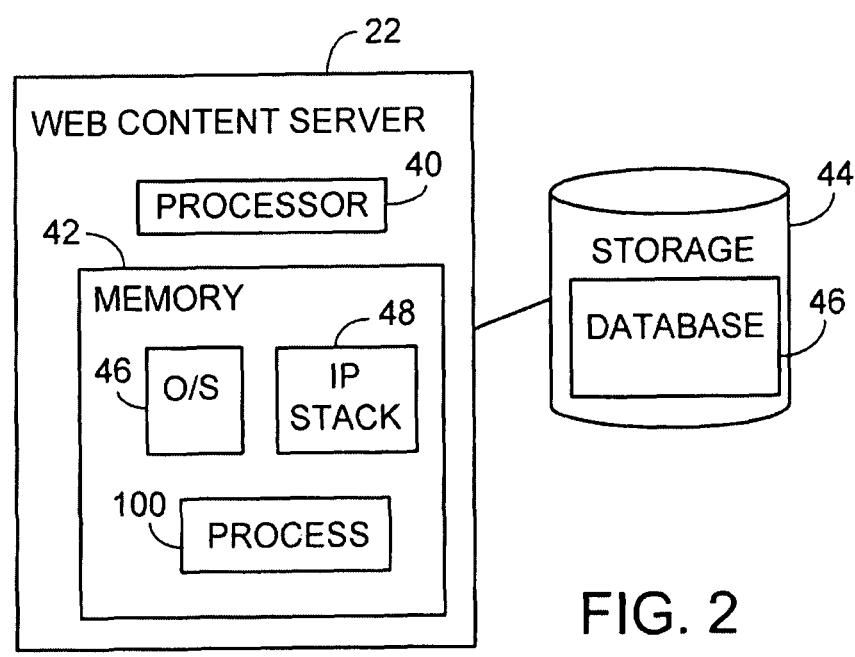
FIG. 2 is a block diagram of the web content server of FIG. 1.

Referring to FIG. 2, web content server 22 includes a processor 40, a memory 42, and a storage device 44. Memory 42 includes an operating system (O/S) 46, such as Linux or Microsoft Windows XP, a TCP/IP stack 48 for interacting with the Internet 20, and instructions to execute a virtual reality (VR) avatar process 100. The storage device 44 includes a database 46 of content. Content may include text, audio, video, and so forth, and may be managed by a database management system. In addition, the content may be used to produce information to used in conducting transactions with the web server 22 or other systems that are accessed through the web server 22.

Figure 3:
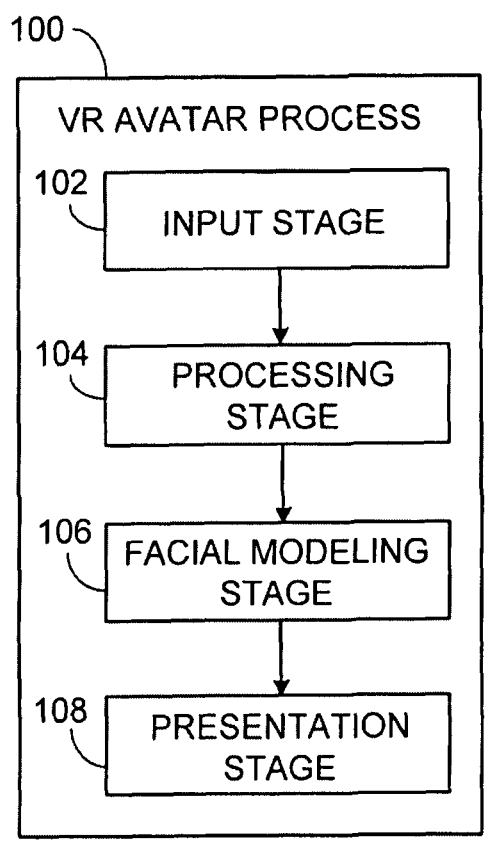
FIG. 3 is a flow diagram of a virtual reality avatar process executed in the web server of FIG. 2.

Referring to FIG. 3, the VR avatar process 100 includes an input stage 102, a processing stage 104, a facial modeling stage 106 and a presentation stage 108. The VR avatar process 100 displays an avatar that answers questions for a user that pertain to content residing in the database 46. The avatar is a virtual reality person that answers the questions verbally in a life-like manner. The avatar may represent any gender and personality, and may be generated to speak in any language. As an example, described is a female virtual reality person. In this example only the avatar's head and shoulders are displayed to the user. In another example, the entire body of the avatar is displayed.

Details of the input stage 102 are discussed in FIG. 4 below.

The processing stage 104 is a user interaction process that uses a conversational engine in conjunction with natural language processing (NLP) techniques to develop and build conversations between the user and the avatar. In a preferred example, the conversational engine is the eGain Assistant from eGain Communications.

The processing stage 104 searches the database 46 for appropriate content to present to the user 18 in response to the user query represented by the text. The response may also include one or words that represent a "key concept" or concepts associated with the response. The key concept triggers a facility to present information on or about the key concept(s). The response and conversation attributes are passed to the facial modeling stage 106.

The facial modeling stage 106 combines the response and the conversational attributes to a face and voice of the avatar. The avatar is a photo-realistic, life-like virtual person. The facial modeling stage 106 uses a facial modeling system, such as LifeFX from LifeFX Stand-In Technology, to bring the avatar to life. The avatar is generated from simple two-dimensional photographs and animated in the facial modeling stage 106.

LifeFX's present humanlike communication, facial expressions and emotions draws on advanced research for sophisticated medical applications by the University of Auckland. LifeFX is a biologically based facial modeling system. The LifeFX Stand-In Virtual Person is realistic and interactive. Rather than requiring developers to spend days generating realistic images, Stand-Ins are "ready to use," human-like faces that serve as flexible containers for the audio content and facial expressions and interactivity.

The animation generated in the facial modeling stage 106 is passed to the presentation stage 108. The presentation stage 108 delivers an appropriate answer or a warning message to the user 18 through the avatar displayed on the GUI 16.

Figure 4:
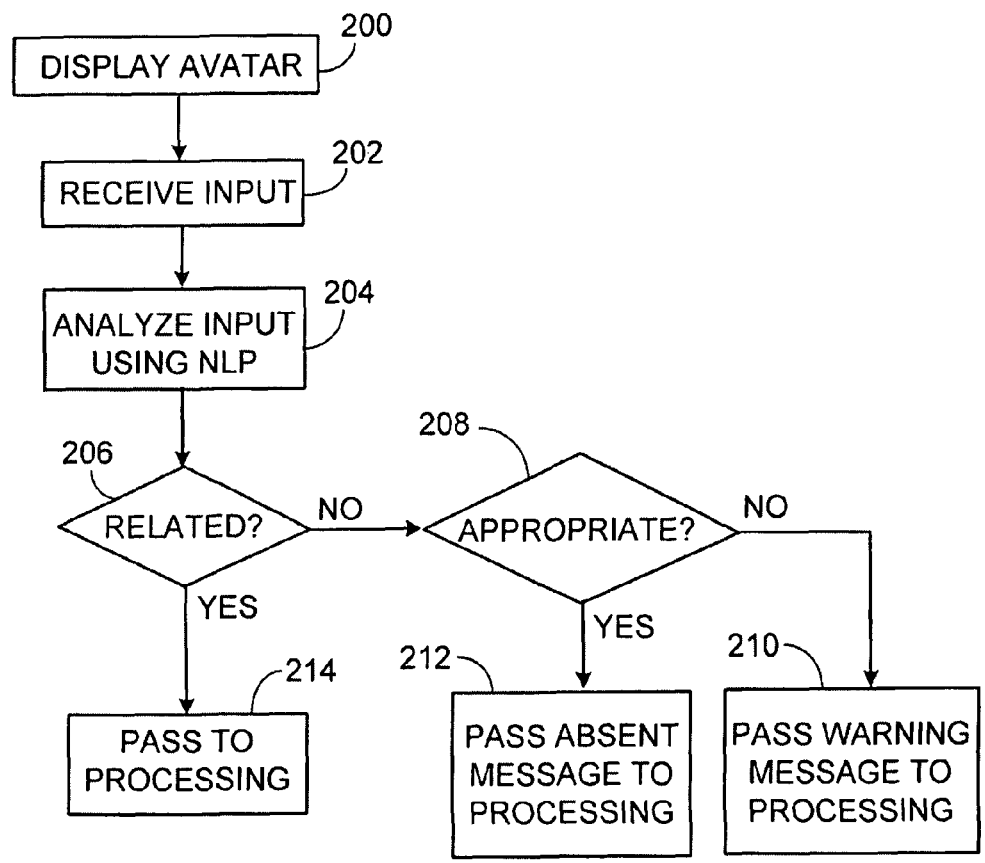
FIG. 4 is a flow diagram of the input stage of the virtual reality avatar process of FIG. 3.

Referring to FIG. 4, the input stage 102 (FIG. 3) displays (200) an avatar to the user 18 on the GUI 16. The input stage receives (202) input through the GUI 16 as text from the user 18. The text may be phrased as a question or keywords without grammar and generally relates to content residing in the database 46. In particular, the text can relate to an event e.g., a transaction that the user desires to conduct with the web server 22 thought assistance by the avatar. The input stage 102 analyzes (204) the input text and determines (206) whether the text relates to content residing in the database 46. If the text does not relate to content residing, in the database, the input stage 102 determines (208) whether the text is inappropriate text. If the text is inappropriate text, the input stage 102 passes (210) a default warning message pertaining to inappropriate input. If the text does not relate to content residing in the database 46 and is not inappropriate input, the input stage 102 passes (212) a warning message indicating that the request content is not contained within the database. If the text is appropriate, e.g., relates to subject matters contained in the database 46, the input stage 102 passes (214) the text to the processing stage 104. The text is used to access information that can assist the avatar in advising the user during conducting the transaction, can offer options, or suggest other transactions to the user based on a relation between the present transaction and what the process 120 (FIG. 5) determines from the text.

Figure 5:
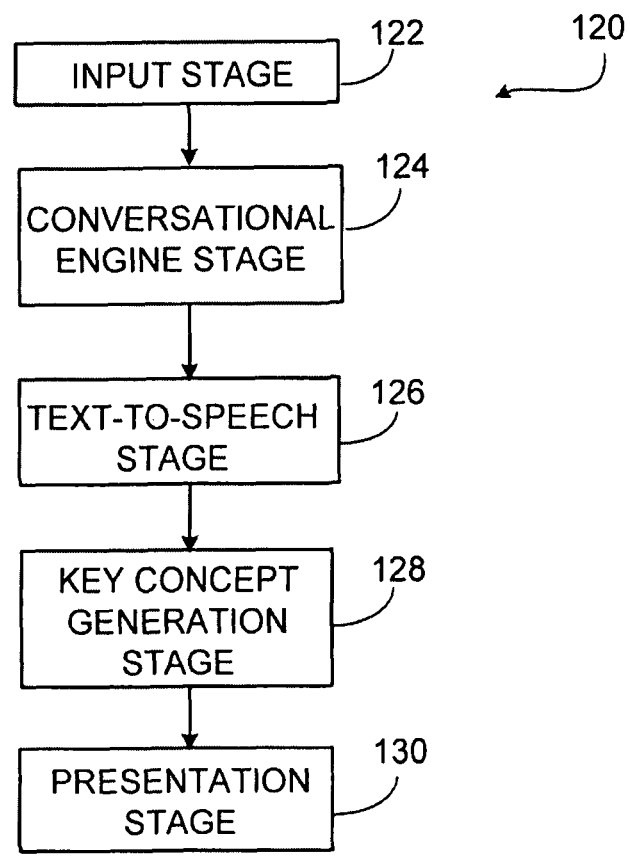
FIG. 5 is a flow diagram of a thought navigation process executed in the web server of FIG. 2.

Referring to FIG. 5, thought navigation process 120 includes an input stage 122, a conversational engine stage 124, a text-to-speech stage 126, a key concept generation stage 128 and a presentation stage 130. The thought navigation process 120 uses the avatar to answer questions for the user that pertain to the transaction based at least in part on content residing in the database 46. The thought navigation process converts the transactions and any questions that the user may pose to the web server to concepts, and presents the user with further information related to the concepts. The further information is presented on the GUI 16 in a format so the user may click on a hyperlink listing the related information and be directed to that related information. The avatar answers the questions and verbally presents the related information in a life-like manner. The information can be used to conduct the transaction, suggest another transaction or process other types of events.

In a preferred embodiment, the related information is displayed on the GUI 16 on a matrix representation using "TheBrain" from TheBrain Technologies Corporation of Santa Monica, Calif.

In FIG. 5, the related content text stream is fed to thought navigation process 120. The Avatar generates a key phrase in the response and sends to thought navigation process 120, which retrieves information on the key phrase. While the thought navigation process 120 is an informational-based retrieval process, the system can also include a process 130 in which a program performs an action based on the related concept.

Figure 6:
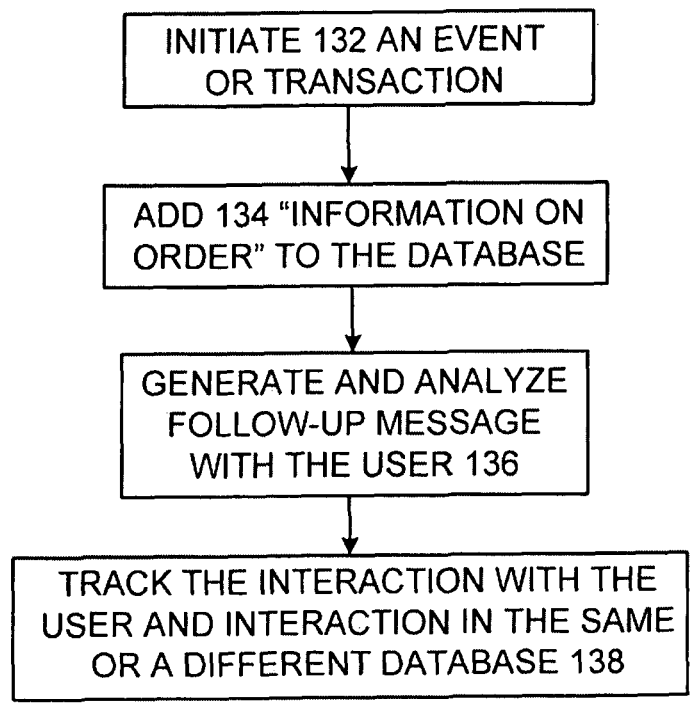
FIG. 6 is a flow diagram depicting a process for launching a transaction based on generated key concepts.

Referring to FIG. 6, a user can initiate an event or transaction, e.g., request 132 an inquiry as to order status for an order being tracked in the database. A program would add 134 "information on order" to the database i.e., that someone asked about a specific product. Follow-up messages with the user can be generated and analyzed statistically 136. The program combines the conversational systems generated in text string or key phrase with a transaction based program. The text file representing the key concept can be displayed or it could be spoken with synthetic speech or it could be spoken with synthetic speech and synchronized with an animated avatar that can pronounce the words.

Subsequently there are a number of actions that the program can take based on the added information. For example, the actions can be marketing related. The program can follow up with messages to the user or other marketing data and can statistically analyze information stored in the database to derive useful market data. Thus, the program retrieves information from the database and sends it to the user, but in addition the program tracks 138 the interaction with the user and stores that interaction in the same or a different database. Thus, the tracked transaction can be subsequently used for either specific marketing to that person or can be analyzed statistically to produce information used in market research.

Alternatively or in addition, the program performs 138 an action such as an inquiry as to financial information that relates to the user. The program can also perform a sales transaction. The program can perform a help desk inquiry that involves customer support for a product or service. The program can also file a report for customer support to report a malfunctioning product, system, or service, e.g., when initiating a transaction by receiving an order to buy a product. In addition, the program can call another program to process an inquiry. For example, the other program can be involved in trading a stock, moving money from one account to another and other forms of transactions.

Figure 7:
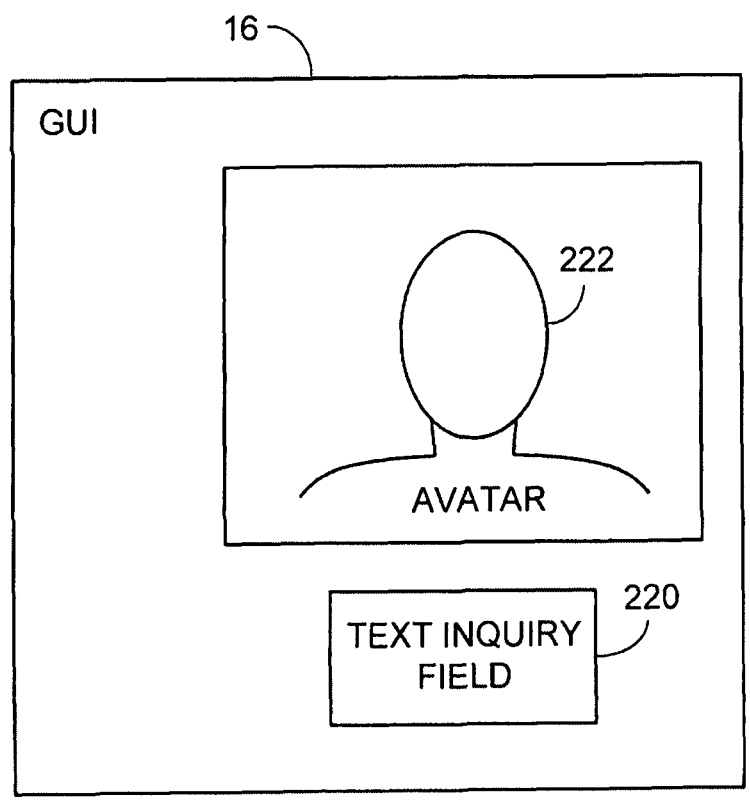
FIG. 7 is an exemplary graphical user interface (GUI).

Referring to FIG. 7, the graphical user interface (GUI) 16 includes a text inquiry field 220 and an avatar. In one example, the user 18 types a query in the text inquiry field 220. In another example, the user verbally inputs a query into the I/O device 14. The avatar 222 answers the query with simulated motions and voice. The avatar's motions simulate an actual person's voice and movements.

Other embodiments are within the scope of the following claims.

What is claimed is:

1. A computer implemented method of conducting commerce, using one or more computers, the method comprising:
    receiving by one or more computer systems text inputs corresponding to transactions;
    analyzing by the one or more computer systems the text inputs by executing natural language processing programs;
    producing by the one or more computers, based on results of analyzing the transactions by the natural language processing programs, added information,
    searching a database in communication with the one or more computer systems for appropriate content to present to the user in response to analyzing the text in the transaction, with the response including one or words that represent a key concept associated with the response triggering a facility to present additional information about the key concept;
    building by a conversational engine running on the one or more computer systems, a conversation based on the transaction requests and key concept,
    statistically analyzing by the one or more computers the information stored in the database based on the added information;
    tracking by the one or more computers interactions with the user;
    storing information derived from tracking the interactions in the database for subsequent marketing to that person to produce information for market research;
    generating in the one or more computers voice-synthesized responses based on the received transaction requests through an avatar;
    generating additional, voice-synthesized, follow-up responses through the avatar in response to the transactions based on information stored in the database, including the added information regarding the transactions;
    receiving by the one or more computer systems subsequent text inputs from the user;
    analyzing in the one or more computers the subsequent text inputs and the voice-synthesized, follow-up responses to determine an action to take; and
    causing execution of the determined action.

2. The method of claim 1 further comprises:
    searching by the one or more computer systems the database to find related information associated with conducting the transactions.

3. The method of claim 1 wherein one of the transactions is a user request as to order status for an order being tracked in the database.

4. The method of claim 1 wherein generating the responses further comprises:
    animating the avatar with a voice and facial movements corresponding to the key concepts.

5. The method of claim 4 wherein animating comprises generating verbal suggestions for conducting one of the transactions.

6. The method of claim 4 wherein animating comprises processing text input from the user with natural language processing techniques to develop and build conversations between a user and the avatar.

7. The method of claim 1 wherein receiving one of the text inputs is in response to a suggestion generated by the avatar.

8. The method of claim 1 wherein the determined action is to perform an inquiry for financial information.

9. The method of claim 1 wherein the determined action is to perform a sales transaction.

10. The method of claim 1 wherein the determined action is to perform a help desk inquiry that involves customer support for a product or service.

11. The method of claim 1 wherein the determined action is to produce a report for customer support to report a malfunctioning product, system, or service.

12. The method of claim 1 wherein the one or more computers are a first set and the determined action is to invoke a second different set of one or more computers to process an inquiry.

13. The method of claim 1 wherein the text inputs are received from a client system executing a web browser program.

14. The method of claim 1 wherein the voice-synthesized responses include one or more words that represent a key concept which triggers a facility to present information about the key concept.

15. The method of claim 1, further comprising converting the transactions, and any questions that the user poses, to concepts, and presenting the user with further information related to the concepts.

16. The method of claim 15, further comprising performing an action based on the concepts.

17. The method of claim 1, further comprising generating key phrases in the voice-synthesized responses and sending the key phrases to a thought navigation process that retrieves information on the key phrases.

18. A computer program product tangibly stored on a computer readable hardware storage device, the computer program product comprising instructions for causing a computer processor device to:
    receive one or more text inputs corresponding to transaction requests;
    analyze the text inputs using natural language processing to build added information from the one or more transaction requests;
    provide added information based on results of analyzing the transaction requests by the natural language processing,
    search a database in communication with the one or more computer systems for appropriate content to present to the user in response to analyzing the text in the transaction, with the response including one or words that represent a key concept associated with the response to trigger a facility to present additional information about the key concept;
    build by a conversational engine, a conversation based on the transaction requests and key concept;
    statistically analyze the information stored in a database to derive useful market data based on the added information;
    track interactions with the user;
    store information derived from tracking the interactions in the database for subsequent marketing to that person to produce information for market research;
    generate voice-synthesized follow-up responses in accordance with the transaction requests through an avatar, with the voice-synthesized, follow-up responses based on information stored in the database, including the statistically analyzed added information regarding the transactions;
    receive subsequent text inputs from the user in response to the voice-synthesized, follow-up responses; and
    analyze the subsequent text inputs and the voice-synthesized, follow-up responses to determine an action to take with respect to the user; and
    cause the determined action to occur.

19. The computer program product of claim 18 further comprise instructions to:
  search the database for related information associated with conducting the transactions.

20. The computer program product of claim 18 wherein one of the transactions is a request as to order status for an order being tracked in the database.

21. The computer program product of claim 18 wherein instructions to generate the response comprise instructions to:
  animate the avatar with a voice and facial movements corresponding to the key concepts.

22. The computer program product of claim 21 wherein instructions to animate comprise instructions to generate verbal suggestions for conducting one of the transactions.

23. The computer program product of claim 21 wherein instructions to animate comprise instructions to use natural language processing to develop and build conversations between a user and the avatar.

24. The computer program product of claim 18 wherein the determined action is to perform an inquiry for financial information.

25. The computer program product of claim 18 wherein determined action is to perform is a sales transaction.

26. The computer program product of claim 18 wherein determined action is to perform a help desk inquiry that involves customer support for a product or service.

27. The computer program product of claim 18 wherein determined action is to produce a report for customer support to report a malfunctioning product, system, or service.

28. The computer program product of claim 18 wherein determined action is to perform invoke a second computer program to process an inquiry.

29. The computer program product of claim 18 wherein one of the text inputs is received in response to a suggestion generated by the server computer and rendered by the avatar.

30. The computer program product of claim 18 wherein instructions to receive transaction requests as text inputs comprise instructions to receive the text inputs from a client system executing a web browser program.

31. A system for conducting commerce, the system comprising:
  a server computer comprising a processor device and memory coupled to the processor device, the server computer configured by a computer program product to:
    receive one or more text inputs corresponding to transaction requests;
    analyze the text inputs using natural language processing to build conversations based on the transaction requests;
    provide added information based on results of analyzing the transaction requests by the natural language processing;
    search a database in communication with the one or more computer systems for appropriate content to present to the user in response to analyzing the text in the transaction, with the response including one or words that represent a key concept associated with the response to trigger a facility to present additional information about the key concept;
    build by a conversational engine a conversation based on the transaction requests and key concept;
    statistically analyze the information stored in the database to derive useful market data based on the added information;
    track interactions with the user;
    store information derived from tracking the interactions in the database for subsequent marketing to that person to produce information for market research;
    generate voice-synthesized, follow-up responses through the avatar in response to the transaction requests based on information stored in the database including the statistically analyzed added information regarding the transactions;
    receive subsequent text inputs from the user;
    analyze the subsequent text inputs and the voice-synthesized, follow-up responses to determine an action to take; and
    cause the determined action to execute.

32. The system of claim 31 further comprising:
  a client system for sending the text input to the server, with the client system executing a web browser program that sends the one or more text inputs and receives data that when rendered on a display associated with the client system, renders a depiction of the avatar and renders by a transducer the voice synthesized responses of the avatar.

33. The system of claim 31 further configured to:
  search the database to find related information associated with conducting the transactions.

34. The system of claim 31 wherein the determined action is to perform a request as to order status for an order being tracked in the database.

35. The system of claim 31 further configured to
  animate the avatar with a voice and facial movements corresponding to the key concepts.

36. The system of claim 35 wherein animating comprises generating verbal suggestions for conducting one of the transactions.

37. The system of claim 35 wherein animating comprises processing text input from the user with natural language processing techniques to develop and build conversations between a user and the avatar.

38. The system of claim 31 wherein receiving one of the text inputs is in response to a suggestion generated by the avatar.

39. The system of claim 31 wherein the determined action is to perform an inquiry for financial information.

40. The system of claim 31 wherein the determined action is to perform a sales transaction.

41. The system of claim 31 wherein the determined action is to perform a help desk inquiry that involves customer support for a product or service.

42. The system of claim 31 wherein the determined action is to produce a report for customer support to report a malfunctioning product, system, or service.

43. The system of claim 31 wherein the determined action is to perform invokes a second computer system for processing an inquiry.

* * * * *